(12) United States Patent
Sunder et al.

(10) Patent No.: US 12,116,198 B2
(45) Date of Patent: Oct. 15, 2024

(54) STERILE STORAGE, TRANSPORT AND DELIVERY OF FLUIDS

(71) Applicant: International Business Machines Corporation, Armonk, NY (US)

(72) Inventors: Madhana Sunder, Meridian, ID (US); Joyce E. Molinelli Acocella, Poughquag, NY (US); Allan Cory VanDeventer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/820,032

(22) Filed: Aug. 16, 2022

(65) Prior Publication Data

US 2024/0059478 A1  Feb. 22, 2024

(51) Int. Cl.
| | | |
|---|---|---|
| *B65D 81/24* | (2006.01) | |
| *B65D 81/32* | (2006.01) | |
| *B65D 83/00* | (2006.01) | |
| *G06F 1/20* | (2006.01) | |

(52) U.S. Cl.
CPC ....... *B65D 83/0072* (2013.01); *B65D 81/245* (2013.01); *B65D 81/3244* (2013.01); *B65D 81/325* (2013.01); *G06F 1/20* (2013.01); *G06F 2200/201* (2013.01)

(58) Field of Classification Search
CPC .............. B65D 83/0072; B65D 81/245; B65D 81/3244; B65D 81/325; G06F 2200/201; G06F 1/20
See application file for complete search history.

(56) References Cited

U.S. PATENT DOCUMENTS

| | | | | |
|---|---|---|---|---|
| 4,098,434 A | | 7/1978 | Uhlig | |
| 4,397,643 A | * | 8/1983 | Rygiel ................. | A61M 1/602 600/573 |
| 4,708,938 A | * | 11/1987 | Hickinbotham ........ | C12C 13/10 426/11 |
| 4,869,402 A | * | 9/1989 | Ash, Jr. ................. | B67D 1/045 222/401 |

(Continued)

FOREIGN PATENT DOCUMENTS

WO  2009033053 A1  3/2009

OTHER PUBLICATIONS

A Guide to Nitrogen Dioxide Gas Sterlisation. (2012) Medical Plastics News. https://www.medicalplasticsnews.com/news/medical-plastics-technology-news/a-guide-to-nitrogen dioxide-gas-sterilisation/. Retrieved from the internet on May 25, 2022.

(Continued)

*Primary Examiner* — Frederick C Nicolas
(74) *Attorney, Agent, or Firm* — Kimberly Zillig

(57) ABSTRACT

A reusable apparatus for storing and delivering a sterile product. The apparatus includes a compressible reservoir adapted to allow for filling, storing, and delivering the sterile product, and a sterile inlet and outlet device including an inlet portion and an outlet portion. The sterile inlet and outlet device is connected to the compressible reservoir and adapted to allow the sterile product to be filled from exterior to the reusable apparatus and into the compressible reservoir through the inlet portion and adapted to allow the sterile product to be delivered from the compressible reservoir through the outlet portion.

18 Claims, 10 Drawing Sheets

(56) References Cited

U.S. PATENT DOCUMENTS

| | | | |
|---|---|---|---|
| 5,178,300 A | | 1/1993 | Haviv |
| 5,265,766 A | * | 11/1993 | Kurtzahn ............ A47J 41/0061 |
| | | | 222/481.5 |
| 5,312,018 A | | 5/1994 | Evezich |
| 5,320,256 A | | 6/1994 | Wood |
| 5,392,958 A | * | 2/1995 | Kurtzahn ............... B65D 77/06 |
| | | | 222/479 |
| 6,062,437 A | | 5/2000 | Mascitelli |
| 6,485,471 B1 | | 11/2002 | Zivitz |
| 6,699,434 B1 | | 3/2004 | Lukasik |
| 7,533,701 B2 | | 5/2009 | Gadzic |
| 9,725,226 B2 | | 8/2017 | Chen |
| 10,646,601 B2 | | 5/2020 | Delaunay |
| 2008/0190961 A1 | | 8/2008 | Wyner |
| 2010/0059544 A1 | | 3/2010 | Dijkstra |
| 2017/0023392 A1 | | 1/2017 | Falcon |

OTHER PUBLICATIONS

Bob Doyle. (1999) Rolling Diaphragm Seals Stay Strong Under Pressure. MachineDesign.com. https://www.machinedesign.com/mechanical-motion-systems/hydraulics/article/21833286/rolling-diaphragm-seals-stay-strong-under-pressure. Retrieved from the internet on May 25, 2022.

Christopher Gallagher. (2014) Designing Formed Diaphragms for Optimum Performance and Manufacturability. MPT.com. https://modernpumpingtoday.com/designing-formed-diaphragms-optimum-performance-manufacturability/. Retrieved from the internet on May 25, 2022.

DiaCom Rolling Diaphragm Theory. https://www.diacom.com/rolling-diaphragm-theory. Retrieved from the internet on May 25, 2022.

Diaphragm Operation. https://www.belloframdiaphragm.com/diaphragm-operation. Retrieved from the internet on May 25, 2022.

Dynamic Seals—Piston Seals. https://www.fst.com/products/dynamic-seals/piston-seals. Retrieved from the internet on May 25, 2022.

PCD—Diaphragm Air Cylinders. (2018) https://damapi.marshbelloframe.com/uploads/bcd_insidecover_2018_8a59fadd45.pdf. pp. 45-56. Retrieved from the internet on May 25, 2022.

ThermoFisher Scientific. "Custom Fluid Transfer Service" —Product Brochure. http://assets.thermofisher.com/TFS-Assets/BPD/brochures/custom-fluid-transfer-service-brochure.pdf. Retrieved from the internet on Mar. 25, 2022.

What are rolling diaphragm cylinders and why use them. (2017) https://www.hydraulicspneumatics.com/cylinders-actuators/what-are-rolling-diaphragm-cylinders-and-why-use-them. Retrieved from the internet on Aug. 15, 2022.

* cited by examiner

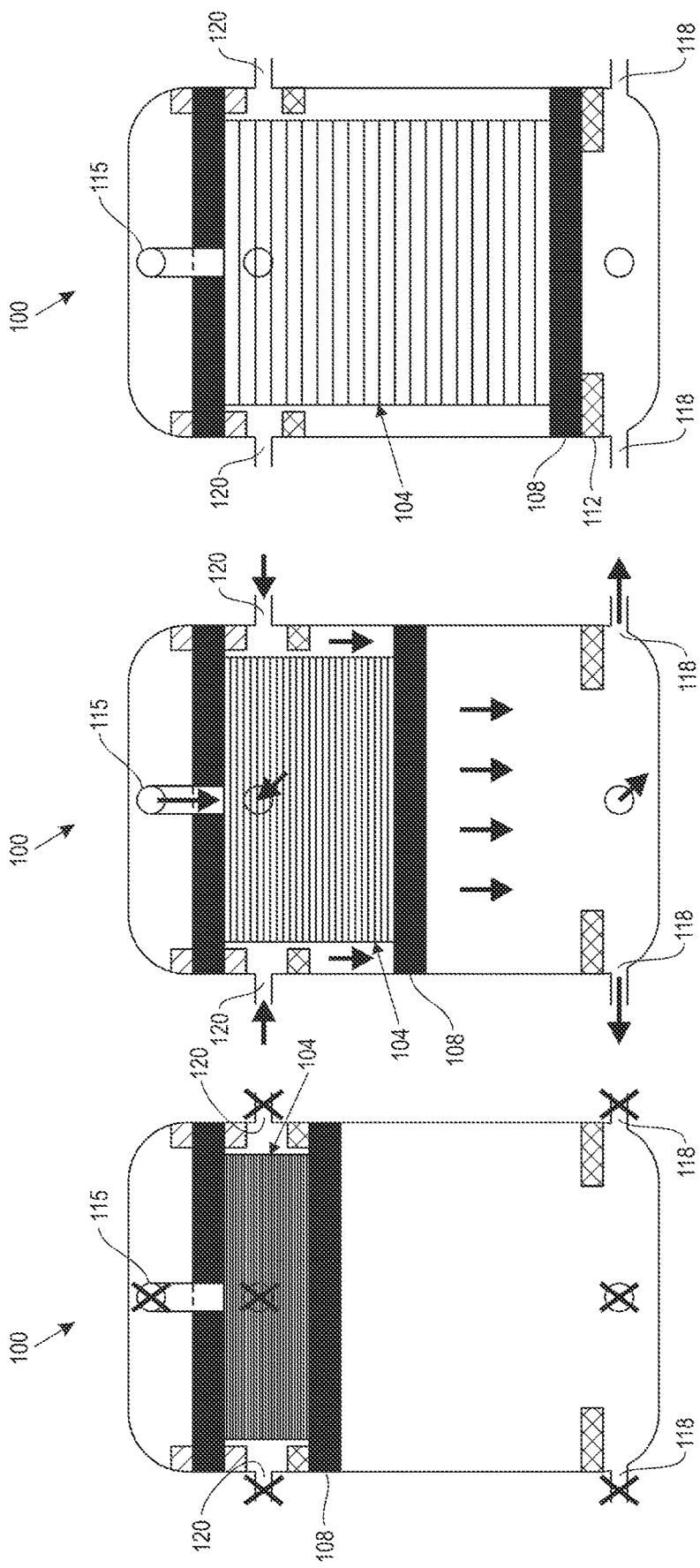

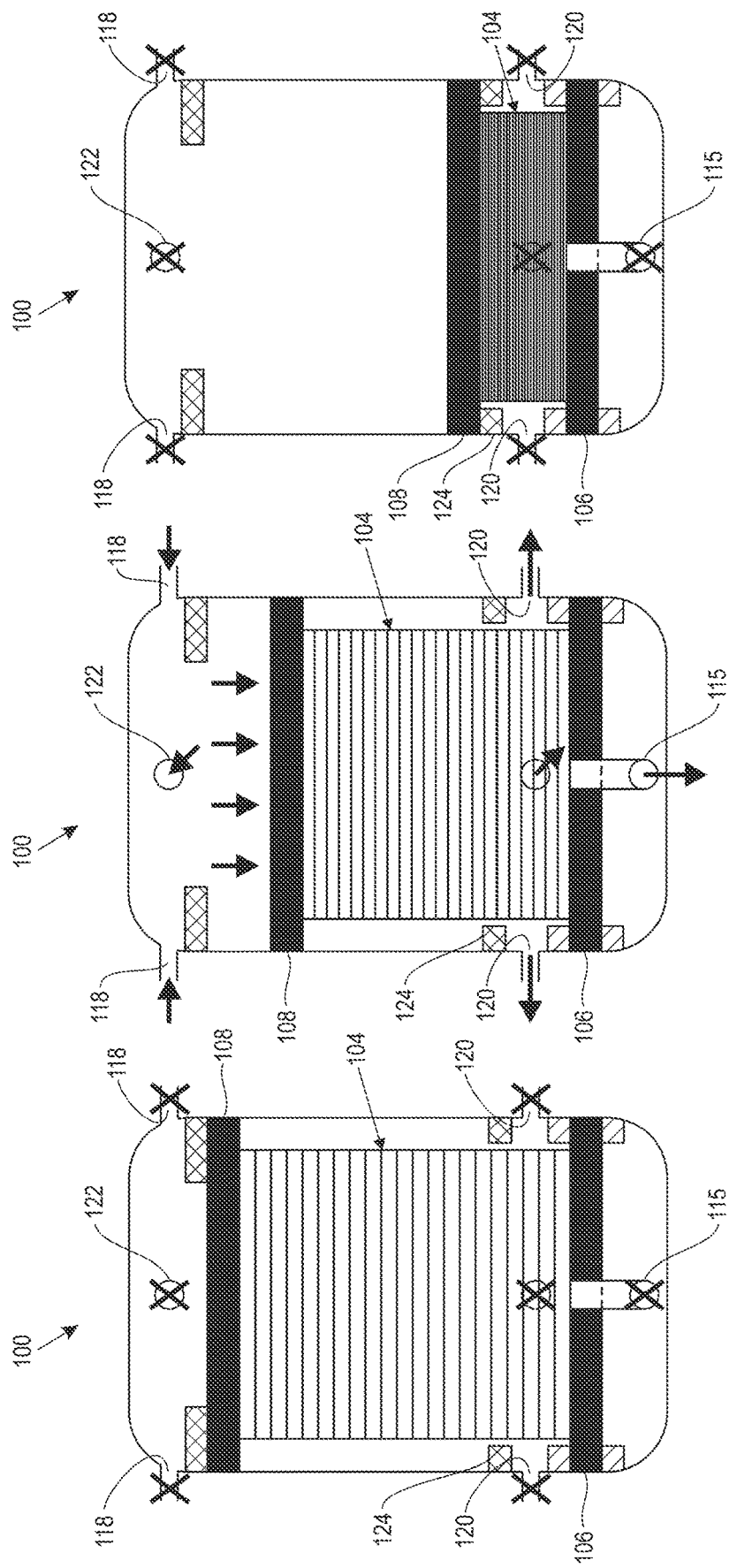

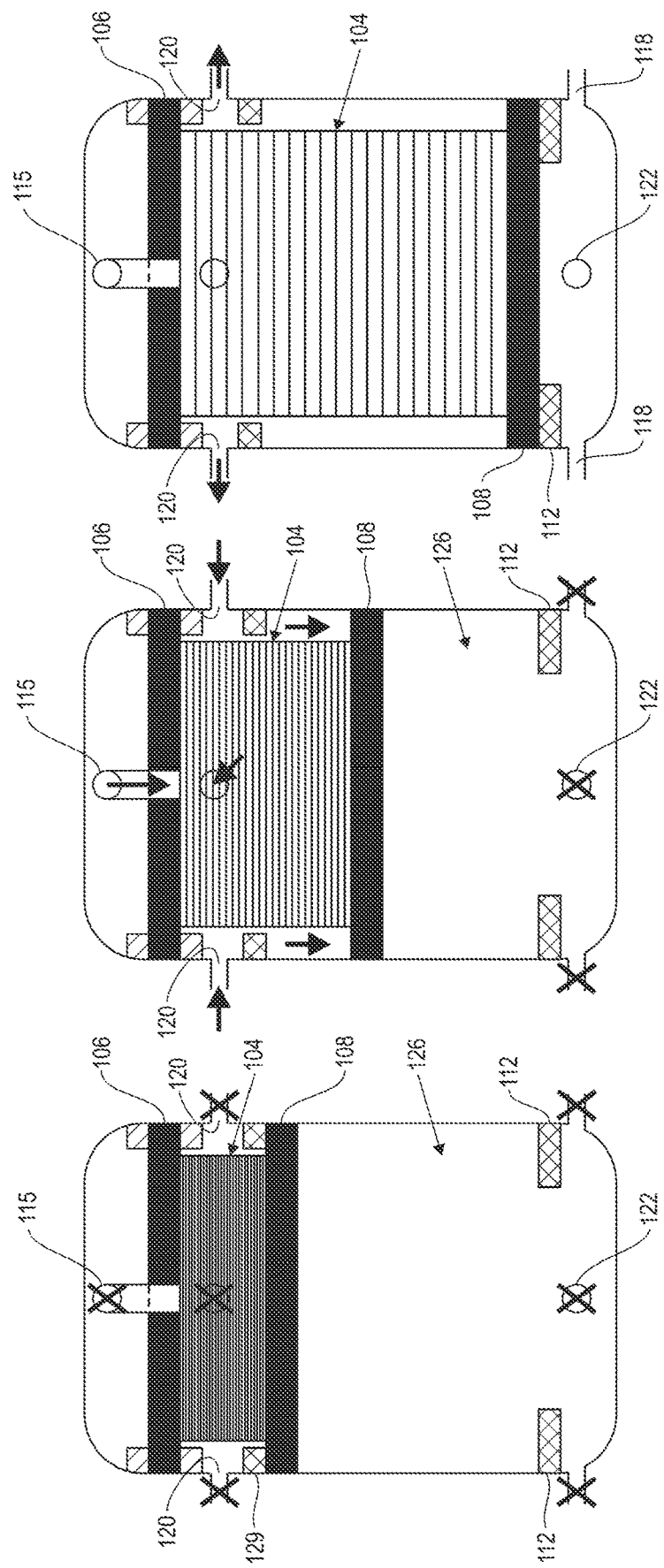

STERILE STORAGE, TRANSPORT AND DELIVERY OF FLUIDS

BACKGROUND

The present disclosure relates generally to a fluid delivery system, and more particularly to a reusable fluid delivery apparatus for storing and delivering sterile fluid. Still more particularly, the present disclosure relates to fluidic cooling apparatuses and methods for cooling a plurality of electronic devices in a computing system, for example.

An industry trend has been to continuously increase the number of electronic devices within a computing system environment. Compactness allows for selective fabrication of smaller and lighter devices that are more attractive to the consumer. Compactness also allows circuits to operate at higher frequencies and at higher speeds due to the shorter electrical connection distances in such devices. Despite these advantages, providing many electronic devices in a small footprint can create device performance challenges. One of these challenges is thermal management of the overall environment. Fluid-cooling methods have recently been incorporated into computer system designs.

SUMMARY

According to some embodiments of the disclosure, there is a reusable apparatus for storing and delivering a sterile product. The apparatus includes a compressible reservoir adapted to allow for filling, storing, and delivering the sterile product, and a sterile inlet and outlet device including an inlet portion and an outlet portion. The sterile inlet and outlet device is connected to the compressible reservoir and adapted to allow the sterile product to be filled from exterior to the reusable apparatus and into the compressible reservoir through the inlet portion and adapted to allow the sterile product to be delivered from the compressible reservoir through the outlet portion.

According to some embodiments of the disclosure, there is a reusable apparatus for filling, storing, and delivering a first sterile product and for filling and storing a second product. The apparatus includes a first compressible reservoir adapted to allow for filling, storing and delivering the sterile product, a second compressible reservoir adapted to allow for filling and storing the second product, and a sterile inlet and outlet device including an inlet portion and an outlet portion. The sterile inlet and outlet device is connected to the first compressible reservoir and adapted to allow the sterile product to be filled from outside the reusable apparatus and into the first compressible reservoir through the inlet portion and adapted to allow the sterile product to be delivered from the first compressible reservoir through the outlet portion.

According to some embodiments of the disclosure, there is a method of storing and delivering a sterile product. The method includes an operation of providing a reusable apparatus for storing and delivering a sterile product. The apparatus includes a compressible reservoir adapted to allow for filling, storing, and delivering the sterile product, and a sterile inlet and outlet device including an inlet portion and an outlet portion. The sterile inlet and outlet device is connected to the compressible reservoir and adapted to allow the sterile product to be filled from exterior to the reusable apparatus and into the compressible reservoir through the inlet portion and adapted to allow the sterile product to be delivered from the compressible reservoir through the outlet portion. The method also includes an operation of expanding the compressible reservoir to fill the compressible reservoir with the sterile product through the inlet portion of the sterile inlet and outlet device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 3A-3C are front sectional views of the apparatus of FIG. 1 through three (3) operations in a sterilization fluid filling process, in accordance with an embodiment of the disclosure.

FIGS. 4A-4C are front sectional views of the apparatus of FIG. 1 through three (3) operations in a sterilization fluid draining process, in accordance with an embodiment of the disclosure.

FIGS. 5A-5C are front sectional views of the apparatus of FIG. 1 through three (3) operations in a sterilization fluid filling process, in accordance with an embodiment of the disclosure.

Figure 1:
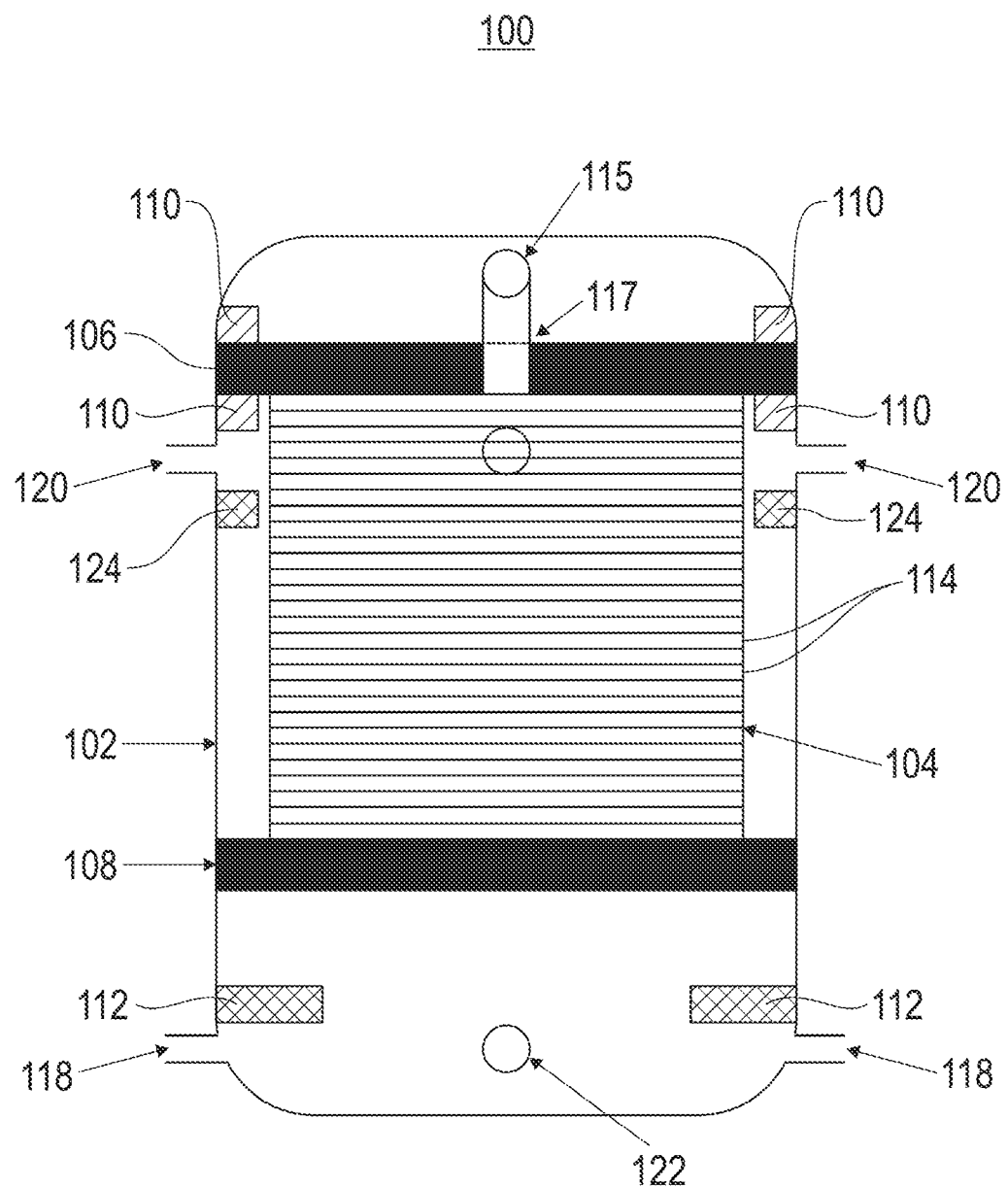
FIG. 1 is a front sectional view of a single variable volume reservoir apparatus, in accordance with an embodiment of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to a product delivery system, and more particularly to a reusable fluid delivery apparatus for storing and delivering sterile fluid in a commercial environment. Still more particularly, the present disclosure relates to fluidic cooling apparatuses and methods for cooling a plurality of electronic devices in a computing system, for example. While the present disclosure is not necessarily limited to such applications, various aspects of the disclosure can be appreciated through a discussion of various examples using this context.

Embodiments of the present disclosure relate to a reusable, portable apparatus that enables filling, storage, transportation and dispensation of large volumes of sterile fluids in the form of a finished product that can be supplied from a supplier to an end user or customer site. Importantly, the fluid should not be allowed to come into contact with the outside environment during the fill, storage, transport and dispensation operations.

Embodiments of the disclosed apparatus can include a sterile inlet and outlet (I/O) device with fluid tight seals to enable contamination free entry and exit of fluid to and from a compressible reservoir. The sterile fluid in-out device can include separate inlet and egress paths for the sterile fluid, utilizing various fluid valves and check valves.

The term "fluid" is defined herein as a substance which is capable of flowing and deforming continuously under action of an external force. A "fluid" is a subset of phases of matter, and includes both liquids and gases.

One feature or advantage of disclosed apparatuses and processes is that the disclosed apparatus is a robust, sterilizable and reusable device designed for handling large volumes of sterile fluids that can be supplied from a supplier to an end user or customer site. Another apparatus can perform fluid fill and dispensation operations by utilizing gravity, stored vacuum and/or air from the surrounding environment. Yet another feature or advantage is that the disclosed apparatus provides a unique arrangement of airtight piston assemblies and air valves to enable movement of sterile fluid to and from a variable volume reservoir.

One further feature or advantage of the disclosed apparatus is that the apparatus can prevent re-entry of dispensed fluid back into the variable volume reservoir, and thus prevent contamination of the apparatus. The apparatus also advantageously can sterilize fluid exit and entry paths and the variable volume reservoir, using fluids, prior to fill and drain operations, and thus can enable re-sterilization and reuse of the apparatus. The apparatus can keep the exit and entry paths under a vacuum or desired sterile environment prior to fill drain operations. The apparatus can further store desired gases in the exit and entry paths, if required, prior to fill and drain operations. In addition, the apparatus can control direction of fluid motion during fill and drain operations. The apparatus can further provide the ability to sample fluids prior to fill and drain.

Advantageously, aspects of the present disclosure can be used to supply cooling fluids to cooling apparatuses or systems used in a computing system. Computing systems can be constructed by a manufacturer and delivered to a customer site. Before transport, fluids can be drained from the computing system to avoid damage due to freezing, for example. The fluids that can be necessary in the computing system while running can be included in the apparatus of the present disclosure and loaded into the system after delivery using the methods described herein.

As another example advantage, aspects of the present disclosure can ensure that cooling fluid is not allowed to come into contact with the outside environment during the fill, storage, transport and dispensation operations of the disclosed apparatus. As a result, contaminated fluid and air will not be introduced into computing, systems, for example, which can protect the computing system from harmful contaminates.

As yet another example advantage, aspects of the present disclosure can be used across various industries, besides relating to computing systems, such as medical, food and beverage, chemical, high purity liquid transport, etc. industries. The aspects of the disclosure can be used, where safe storage, filling, transportation and/or dispensation of sterile fluids is a priority.

A further example advantage of the aspects of the present disclosure is that external or internal pumps may not be required for use in the disclosed apparatus or method in some embodiments. Yet another example advantage is that some embodiments can be utilized for dispensing a fresh sterile fluid and storing used fluid simultaneously from a same reservoir in the disclosed apparatus.

Turning to the figures, FIG. 1 is a front sectional view of a single variable volume (SVV) reservoir apparatus 100, in accordance with an embodiment of the disclosure. The SVV reservoir apparatus 100 is capable of being automatically filled and automatically dispensed without using an external device, such as a pump, to do so. An external pump can alternatively be used, however.

The SVV reservoir apparatus 100 can include an outer shell (or casing) 102. The shape of the outer shell 102 can be a cylindrical shape, for example. Another possible shape of the outer shell 102 can be a hexagonal prism. Other suitable shapes, however, are also contemplated.

The outer shell 102 can be made of a hard material and/or a transparent material. Some examples of suitable materials include those that can be transparent, hard, and lightweight. Plastic materials can be used for the outer shell 102, with examples including, but not limited to, polycarbonate, and polyethylene terephthalate (high density polyethylene). Other suitable materials used for the outer shell 102 are contemplated. In addition, the outer shell 102 can include fill level markings (not shown) along a side to observe a volume quantity of stored sterile fluid within the SVV reservoir apparatus 100, for example.

A variable volume reservoir 104 is shown included within the SVV reservoir apparatus 100 in FIG. 1, and is surrounded by the outer shell 102. The variable volume reservoir 104 is compressible and is capable of being expanded and collapsed to vary the amount of a fluid that is held therein. The variable volume reservoir 104 can expand in order to hold a volume of fluid and can collapse or contract in order to release fluid from the variable volume reservoir 104. The variable volume reservoir 104, as shown, includes an airtight, fixed piston head 106 attached on one end and an airtight, moveable piston head 108 attached on another end. The fixed piston head 106 can be held in place within the outer shell 102, for example using posts 110 located on an inner surface of the shell 102 and can be located above and below the fixed piston head 106. A hard limit or stop 112 can be located on the inner surface of the outer shell 102 in order to limit or restrict movement of the moveable piston head 108 within the outer shell 102 towards one end of the SVV reservoir apparatus 100. The stop 112 can prevent overfilling of the fluid within the SVV reservoir apparatus 100 and can restrict movement of the variable volume reservoir 104 to design limits.

The moveable piston 108 can be raised or lowered using either a non-sterile gas supplied using an external pump or by using gravity, for example. The moveable piston 108 can apply a uniform force on an end of the variable volume reservoir 104 during fill and drain operations. An advantage of using the moveable piston 108 is that sterile fluid and variable volume reservoir 104 may never experience any unnecessary external loads or forces during storage or transport. The moveable piston 108 can also act as a level indicator against the fill level markings present on the outer shell 102.

The variable volume reservoir 104 can include bellows 114, for example, as shown. Suitable materials used for the variable volume reservoir 104 can be non-transparent or transparent, and can include plastics (e.g., polypropylene, thermoplastic elastomers, low density polyethylene, etc.), rubbers, metals, etc. The variable volume reservoir 104 is made up of fluid-tight materials, and the entire SVV reservoir apparatus 100 can be checked for zero pressure decay. Other suitable materials and configurations of the variable volume reservoir 104 are, however, also contemplated by the disclosure.

The SVV reservoir apparatus 100 is shown including a sterile inlet and outlet (I/O) device 116 (shown in FIGS. 2A-2B) through which sterile fluid can enter and exit the variable volume reservoir 104. The sterile I/O device 116 can be connected to a sterile fluid supply (not shown), for example, which can be separate from the SVV reservoir apparatus 100. As shown, the sterile I/O device 116 can extend through an opening 115 in the outer shell 102 of the SVV reservoir apparatus 100, and through a side or a top of the outer shell 102 The sterile I/O device 116 can also extend through the opening 115 and through the fixed piston head 106 in order to connect to an interior of the variable volume reservoir 104 and can fill or drain the variable volume reservoir 104. Movement of the moveable piston head 108 can, for example, pull sterile fluid (from an external supply, not shown) into the variable volume reservoir 104 through the sterile I/O device 116.

As shown, there are in/out air valves 118, 120 that extend through the shell 102. One set of air valves 120 are located through the shell 102 with access to the variable volume reservoir 104. A second set of air valves 118 are located through the shell 102 below the moveable piston 108. In addition, towards one end of the SVV reservoir apparatus 100, opposite the sterile I/O device 116, there is shown an additional air valve 122 that can be located near the bottom of the outer shell 102. Any kind of common fluid handling valves such as diaphragm, ball, needle, and butterfly, etc., valves can be used for stopping and controlling fluids through air valves 118, 120. The pairs of valves 118, 120 on a lower portion and an upper portion of the apparatus 100, respectively, can be manually closed or can be closed using pneumatic controls. Other contemplated and suitable methods and devices can be used to open and close the air valves 118, 120, however.

The air valves 118, 120 can be, for example, either pneumatic valves or manual air control valves, as pneumatic valves, the air valves 118, 120, 122 can help create proper air pressure and flow rates within air-powered systems, such as the SVV reservoir apparatus 100. The air valves 118, 120, 122, as manual air control valves, can alternatively be used to manage air pressure within the SVV reservoir apparatus 100.

Figure 2A:
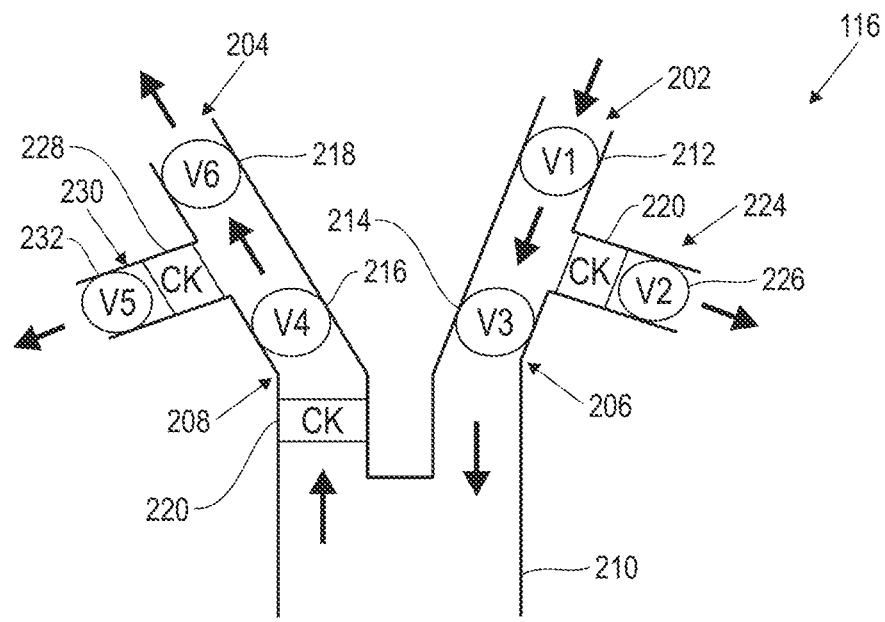
FIG. 2A is a front sectional view of a sterile fluid inlet-outlet (I/O), in accordance with an embodiment of the disclosure.
Figure 2B:
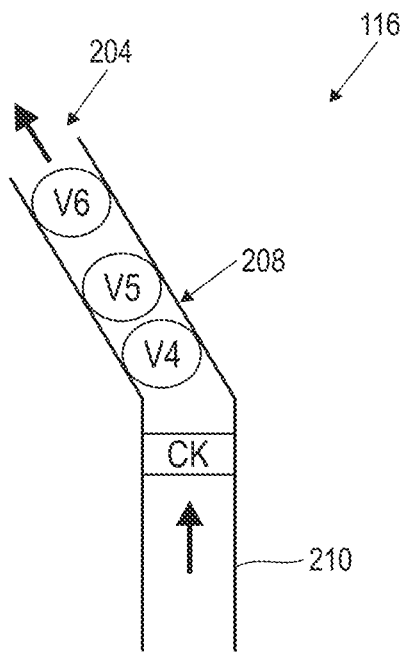
FIG. 2B is a side sectional view of a fluid outlet side of the sterile fluid I/O of FIG. 2A, in accordance with an embodiment of the disclosure.

FIGS. 2A and 2B are a front sectional view and a side sectional view, respectively, of the sterile I/O device 116 of FIG. 1, consistent with some embodiments. The sterile I/O device 116 can be located on a side, or a top, of the outer shell 102 and configured such that a fluid inlet 202 and a fluid egress (i.e., outlet) 204 both extend between an interior and an exterior of the outer shell 102. The sterile I/O device 116 shown has first and second branches, or a fluid entry path 206 and a fluid dispense path 208, that each, respectively, extend from the fluid inlet 202 and the fluid egress 204. A stem portion 210 of the sterile I/O device 116, from which the fluid entry path 206 and the fluid dispense path 208 extend, can extend through an opening 117 in the fixed piston head 106 and into the variable volume reservoir 104 (as shown in FIG. 1). Airtight seals on such openings 115, 117, for example, can be included to prevent sterile fluid from coming into contact with an external environment.

The fluid entry path 206 and the fluid dispense path 208 can include four (4) main fluid valves in their paths, as shown, although other numbers of fluid valves are contemplated. As shown in FIG. 2A, the four (4) fluid valves, labelled V1, V3, V4 and V6 (and numbered 212, 214, 216, 218, respectively) are in the fluid entry path and fluid dispense path 206, 208. In addition, a check valve, labelled "CK" (numbered 220) is within the fluid dispense path 208. Although not shown, a check valve can also, or alternatively, be within the fluid entry path 206.

The fluid entry path 206 is a fluid route used for filling the variable volume reservoir 104. Prior to filling, a vacuum can exist between the V1 valve 212 and the V3 valve 214. Fluid can enter through the V1 valve 212 and then through the V3 valve 214 and into the variable volume reservoir 104. In one embodiment, a check valve (not shown) can be included after the V3 valve 214 to prevent fluid from the variable volume reservoir 104 from moving back into the fluid entry path 206. In another embodiment, a check valve 222 can be in a first side branch 224 to the fluid entry path 206 just before the V2 valve 226. The check valve 222 can prevent entry of fluid back into the fluid dispense path 208. The V2 valve 226 can be used to create a vacuum between the V1 valve 212 and the V3 valve 206, The V2 valve 226 can also be used for collecting a portion of a fluid fill for testing purposes (e.g., a quality check).

The fluid dispense path 208 is a fluid route that can be used for dispensing fluid out of the variable volume reservoir 104. Prior to fluid exit from the variable volume reservoir 104, a vacuum can exist between the V4 valve 216 and the V6 valve 218. Fluid can exit through the check valve 220, which can be provided to prevent fluid entry back into the variable volume reservoir 104 when closed, then passed through the V4 valve 216 and the V6 valve 218 and dispensed. In another embodiment, a check valve 228 can be in a second side branch 230 to the fluid dispense path 208 just before the V5 valve 232. The check valve 228 can prevent entry of fluid back into the fluid dispense path 208. The V5 valve 232 can create a vacuum between the V4 valve 216 and the V6 valve 218. The V5 valve 232 can be used to collect a portion of the dispensed fluid for testing purposes (e.g., a quality check).

The sterile I/O device 116 provides an ability to prevent re-entry of dispensed sterile fluid back into the variable volume reservoir 104. Also, the sterile I/O device 116 provides an ability to sterilize fluid exit and entry paths and the variable volume reservoir 104 itself using fluids prior to fill and drain operations enabling re-sterilization and re-use of the apparatus 100. Further, the sterile I/O device 116 provides an ability to keep paths under a vacuum or a sterile environment prior to fill and drain operations. In addition, the sterile I/O device 116 provides an ability to sample fluids prior to fill and drain operations. In addition, the sterile I/O device 116 provides an ability to store desired gases in exit and entry paths, if required, prior to fill and drain operations.

FIGS. 3A-3C show the SVV reservoir apparatus 100 through three (3) operations in a sterilization fluid filling process, in accordance with an embodiment of the disclosure. In FIG. 3A, the SVV reservoir apparatus 100 is oriented such that the opening 115, connected to the sterile I/O device 116 (not shown), is facing upwards. The variable volume reservoir 104 is shown in a fully compressed state. The lower and upper pairs of air in/out valves 118, 120, on both sides of the apparatus 100 near both ends, are shown closed, as indicated by the X's in the figure. Also, the opening 115 to the sterile I/O device 116 is closed and the air valve 122 is shown closed.

In FIG. 3B, a further operation is shown in which the variable volume reservoir 104 is partially filled with a sterilization agent (e.g., fluid). The V1 valve 212 and the V3 valve 214 (shown in FIG. 2A) are opened prior to the operation shown in FIG. 3B. As shown in FIG. 3B, the pairs of air valves 118, 120 are all opened. Air is taken in by air valves 120 and moves out through air valves 118, as shown by the arrows. External pumps can be utilized for filling with a gaseous sterilant such as diluted nitrogen dioxide, for example.

FIG. 3C shows another operation after that of FIG. 3B and illustrates the SVV reservoir apparatus 100 once the filling process is stopped or completed. The moveable piston head 108 has reached the stop 112 and the filling process is shown complete. The SVV reservoir apparatus 100 can then be held in a steady state until a time period has passed and sterilization of the SVV reservoir apparatus 100 is complete. A sterile fluid can be left inside the SVV reservoir apparatus 100 until sterilization is complete, and/or until the SVV reservoir apparats 100 is included in another system and drained.

FIGS. 4A-4C show the SVV reservoir apparatus 100 through three (3) operations in a sterilization fluid draining process, in accordance with an embodiment of the disclosure. FIG. 4A shows a subsequent operation after the operation shown in FIG. 3C, for example. In FIG. 4A, the SVV reservoir apparatus 100 is inverted and oriented such that the opening 115 to the sterile I/O device 116 (not shown) is facing downwards. The air valves 118, 120, 122 are closed, as indicated by the X's. An external pump (not shown) can be used for the draining process.

FIG. 4B shows the moveable piston head 108 (by arrows) moving downward to empty or drain (e.g., collapse) the variable volume reservoir 104. The air valves 118, 120, 122 are opened. Air goes in the air valves 118 and out the air valves 120, as shown by the arrows. Sterilization agent (e.g., fluid) movies out or drains out of the opening 115.

The moveable piston head 108, in FIG. 4C, is shown in contact with the stop 124 and may have reached a state of vacuum. The X's indicate that the air valves 118, 120, 122 are closed immediately after draining is complete. The SVV reservoir apparatus 100 in FIG. 4C is sterile and ready for use as a result of the process described with regard to FIGS. 3A-3C and 4A-4C.

FIGS. 5A-5C show the SVV reservoir apparatus 100 through three (3) operations in a sterilization fluid filling process, in accordance with an embodiment of the disclosure. Prior to the filling process shown, the SVV reservoir apparatus 100 can be oriented such that the opening 115 to sterile I/O device 116 (not shown) is facing upwards. The variable volume reservoir 104 is in a fully compressed state, as shown in FIG. 5A. The opening 115 and the air valves 118, 120, 122 are closed, as indicated by the X's. As shown, a bottom portion of the apparatus 100 is under a vacuum 126.

FIG. 5B shows the variable volume reservoir 104 of the apparatus 100 expanded and sterile fluid beginning to enter through the opening 115. The V1 valve 212 and the V3 valve 206 of sterile fluid I/O 16 (as in FIG. 2A) can be opened first, followed by opening of the air valves 120 through which air can enter. Gravity and air (from the surroundings) being fed into the top portion of the apparatus 100 can assist in the filling process.

Once the moveable piston head 108 contacts the hard stop 112, as in FIG. 5C, the filling process can stop. Air is removed from the top portion of the SVV reservoir apparatus 100 through air valves 120 until a vacuum is formed. Further, all the valves 118, 120, 122 are closed immediately (not shown). The SVV reservoir apparatus 100 is then ready for transport and storage of sterile fluid.

Figure 6C:
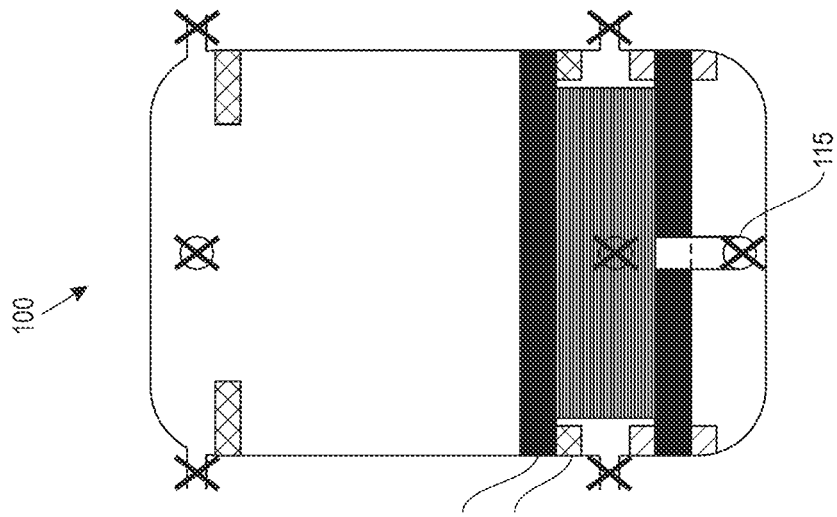
FIGS. 6A-6C are front sectional views of the apparatus of FIG. 1 through three (3) operations in a sterilization fluid draining process, in accordance with an embodiment of the disclosure.
Figure 6B:
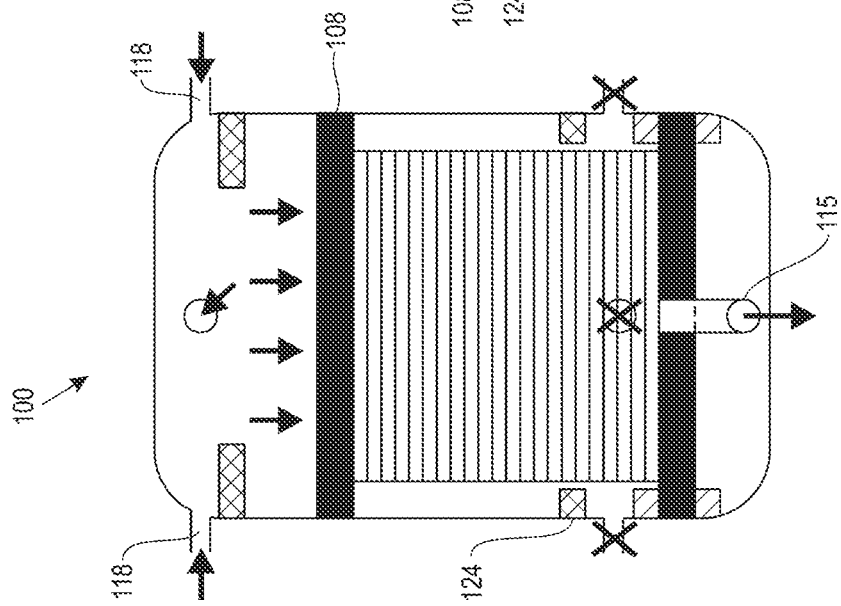
Figure 6A:
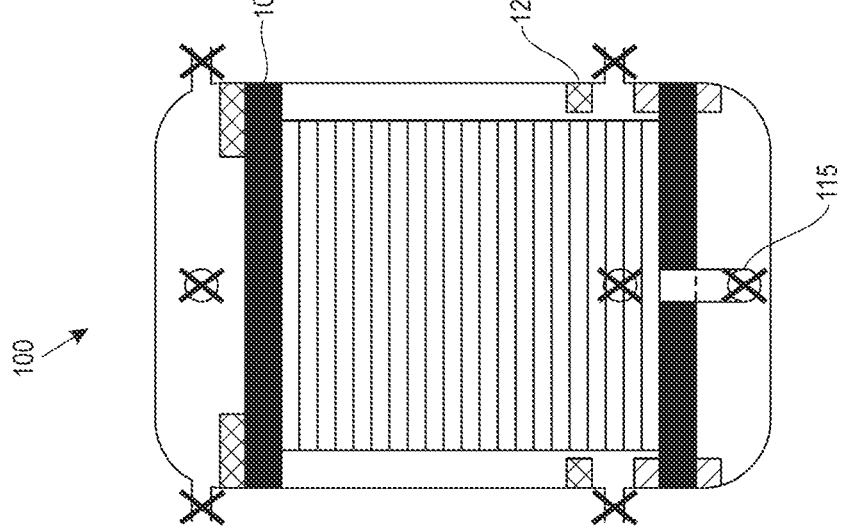

FIGS. 6A-6C show the SVV reservoir apparatus 100 through three (3) operations in a sterilization fluid draining process, in accordance with an embodiment of the disclosure. During the draining process, the opening 115 of the sterile I/O device 116 (not shown) is faced downwards, as shown in FIG. 6A. The air valves 118, 120, 122 are all closed as shown (by the X's), and the opening 115 is closed. As shown in FIG. 6B, the opening 115 is opened, followed by the air valves 118 in the top portion of the apparatus 100. Gravity and air (from the surroundings) can be fed into the top portion of the apparatus 100, which can assist in the draining process. The draining process stops once the moveable piston head 108, such as in FIG. 6C, contacts the stop 124 or when a desired level of fluid has been dispensed. Level markings can be present on the outer shell 102. Alternatively, a system into which the apparatus 100 is inserted can sense the level of fluid drained into the system and cause the draining from the SVV reservoir apparatus 100 to stop, for example. The air valves 118, 120, 122 and the opening 115 are then closed, such as shown with the X's in FIG. 6C.

Figure 7:
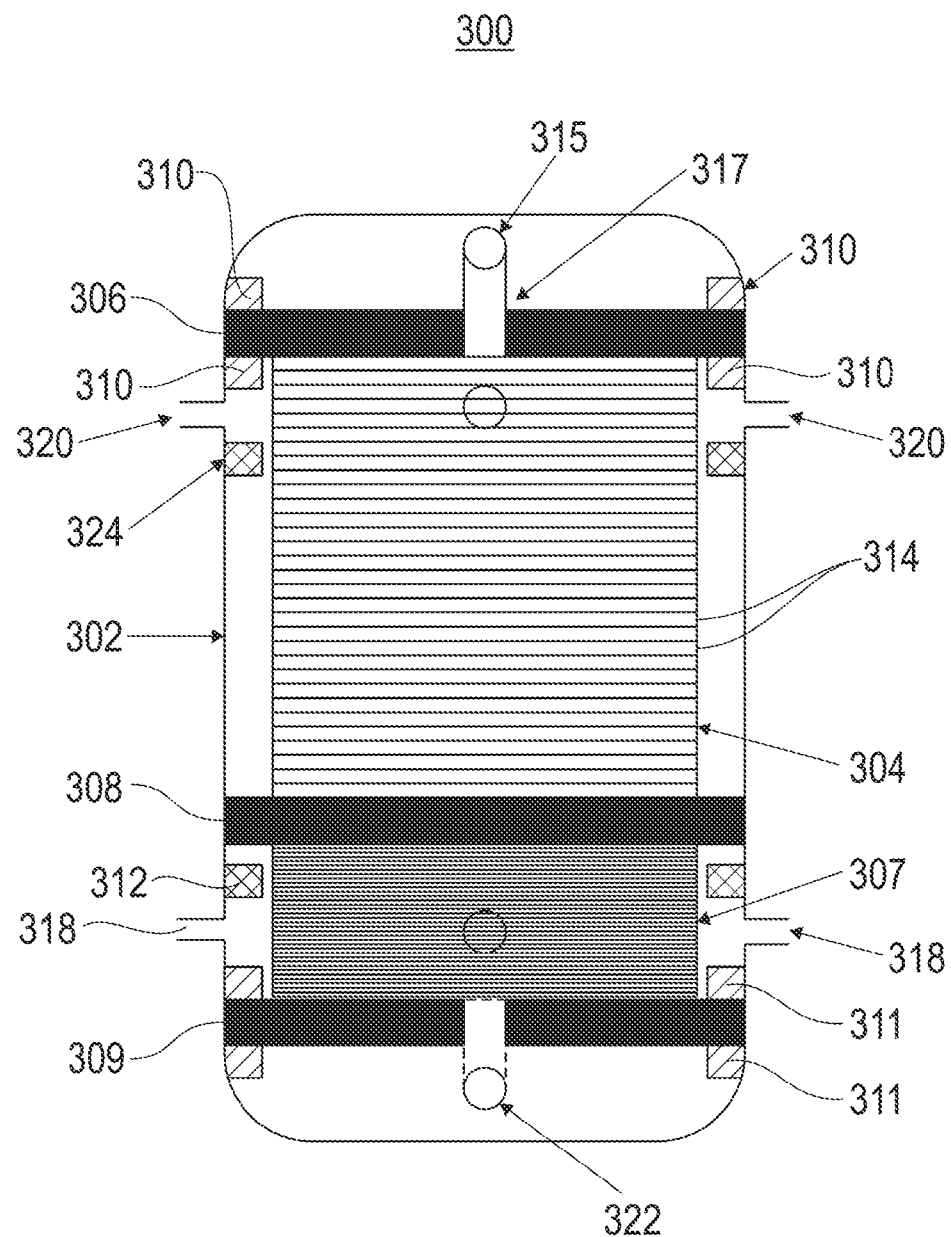
FIG. 7 is a front sectional view of a dual variable volume reservoir apparatus, in accordance with an embodiment of the disclosure.

FIG. 7 is a front sectional view of a dual variable volume (DVV) reservoir apparatus 300 in accordance with an embodiment of the disclosure. The DVV reservoir apparatus 300 is capable of dispensing sterile fluid at the same time as collecting used fluid, for example.

The DVV reservoir apparatus 300 can include an outer shell (or casing) 302. The shape of the outer shell 302 can be a cylindrical shape, for example. Another possible shape of the outer shell 302 can be a hexagonal prism. Other suitable shapes, however, are also contemplated.

The outer shell 302 can be made of a hard material and/or a transparent material. Some examples of suitable materials include those that can be transparent, hard, and lightweight. Plastic materials can be used for the outer shell 302, with examples including, but not limited to, polycarbonate, and polyethylene terephthalate (high density polyethylene). In addition, the outer shell 302 can include fill level markings (not shown) along a side to observe a volume quantity of stored sterile fluid within the DVV reservoir apparatus 300, for example.

A variable volume reservoir 304 is shown included in the DVV reservoir apparatus 300. The variable volume reservoir 304 is compressible and is capable of being expanded and collapsed to vary the amount of a fluid that is held therein. The variable volume reservoir 304 has a first portion 305 and a second portion 307 that can both expand in order to hold a volume of fluid and can both collapse or contract in order to release fluid from the variable volume reservoir 304. The first and second portions 305, 307 can collapse and expand independently from each other. Alternatively, the DVV reservoir apparatus 300 can include a first compressible reservoir and a second compressible reservoir (such as portions 305, 307 being separate).

The variable volume reservoir 304, as shown, includes an airtight, fixed piston head 306 attached on one end and an airtight, moveable piston head 308 attached between the first portion 305 and the second portion 307 of the variable volume reservoir 304. A second fixed piston head 309 is attached on another end of the variable volume reservoir 304. The fixed piston heads 306, 309 can be held in place within the outer shell 302, for example using posts 310, 311 located on an inner surface of the shell 302 and can be located above and below the fixed piston heads 306, 309, respectively. Hard limits or stops 312, 324 can be located on the inner surface of the outer shell 302 to limit or restrict movement of the moveable piston head 208 within the outer shell 302 in both directions. The stops 312, 314 can prevent overfilling of the fluid within the DVV reservoir apparatus 300 and can restrict movement of the variable volume reservoir 304 to design limits.

The moveable piston 308 can be raised or lowered using either a non-sterile gas supplied using an external pump or by using gravity, for example. In another embodiment, the second portion 307 of the variable volume reservoir 304 can use either a non-sterile fluid for raising or lowering the moveable piston 308. The moveable piston 308 can apply a uniform force on moving ends of both of the first and second portions 305, 307 of the variable volume reservoir 304 during fill and drain operations. A sterile fluid and the variable volume reservoir may not experience any unnecessary external loads or forces during storage or transport.

The variable volume reservoir 304 can include bellows 314, for example, as shown. Suitable materials used for the variable volume reservoir 304 can be non-transparent or transparent, and can include plastics (e.g., polypropylene, thermoplastic elastomers, low density polyethylene, etc.), rubbers, metals, etc. The variable volume reservoir 304 is made up of air/fluid tight materials, and the entire apparatus can be checked to ensure zero pressure decay. Other suitable materials and configurations of the variable volume reservoir 304 are, however, also contemplated by the disclosure.

The DVV reservoir apparatus 300 is shown including an opening 315 that can accommodate the sterile I/O device 116 (as shown in FIGS. 2A-2B and described above) through which sterile fluid can enter and exit. The sterile I/O device 116 can be connected to a sterile fluid supply (not shown) separate from the DVV reservoir apparatus 300 to the first portion 305 of the variable volume reservoir 304. As shown, the sterile I/O device 116 can extend through the fixed piston head 306. Movement of the moveable piston head 308 can pull sterile fluid (from an external supply, not shown) into the variable volume reservoir 304 through the sterile I/O device 116.

As shown, there are pairs of in/out air valves 318, 320 that extend through the shell 302. One set of air valves 318 are located through the shell 302 with access to the second portion 307 of the variable volume reservoir 304. A second set of air valves 320 are located through the shell 302 above the moveable piston 308. In addition, towards one end of the DVV reservoir apparatus 300, opposite the opening 315 to the sterile I/O device 116 (not shown), there is shown an additional air valve 322 that can be located near the bottom of the outer shell 302. Any kind of common fluid handling valves such as diaphragm, ball, needle, and butterfly, etc., can be used for stopping and controlling fluids as air valves 318, 320. The pairs of valves 318, 320 on an upper portion and a lower portion of the apparatus 300, respectively, can be manually closed or can be closed using pneumatic controls. Other contemplated and suitable methods and devices can be used to open and close the air valves 318, 320, however.

The air valves 318, 320 can be, for example, either pneumatic valves or manual air control valves, as pneumatic valves, the air valves 318, 320, 322 can help create proper air pressure and flow rates within air-powered systems, such as the DVV reservoir apparatus 300. The air valves 318, 320, 322, as manual air control valves, can alternatively be used to manage air pressure within the DVV reservoir apparatus 300.

Figure 8:
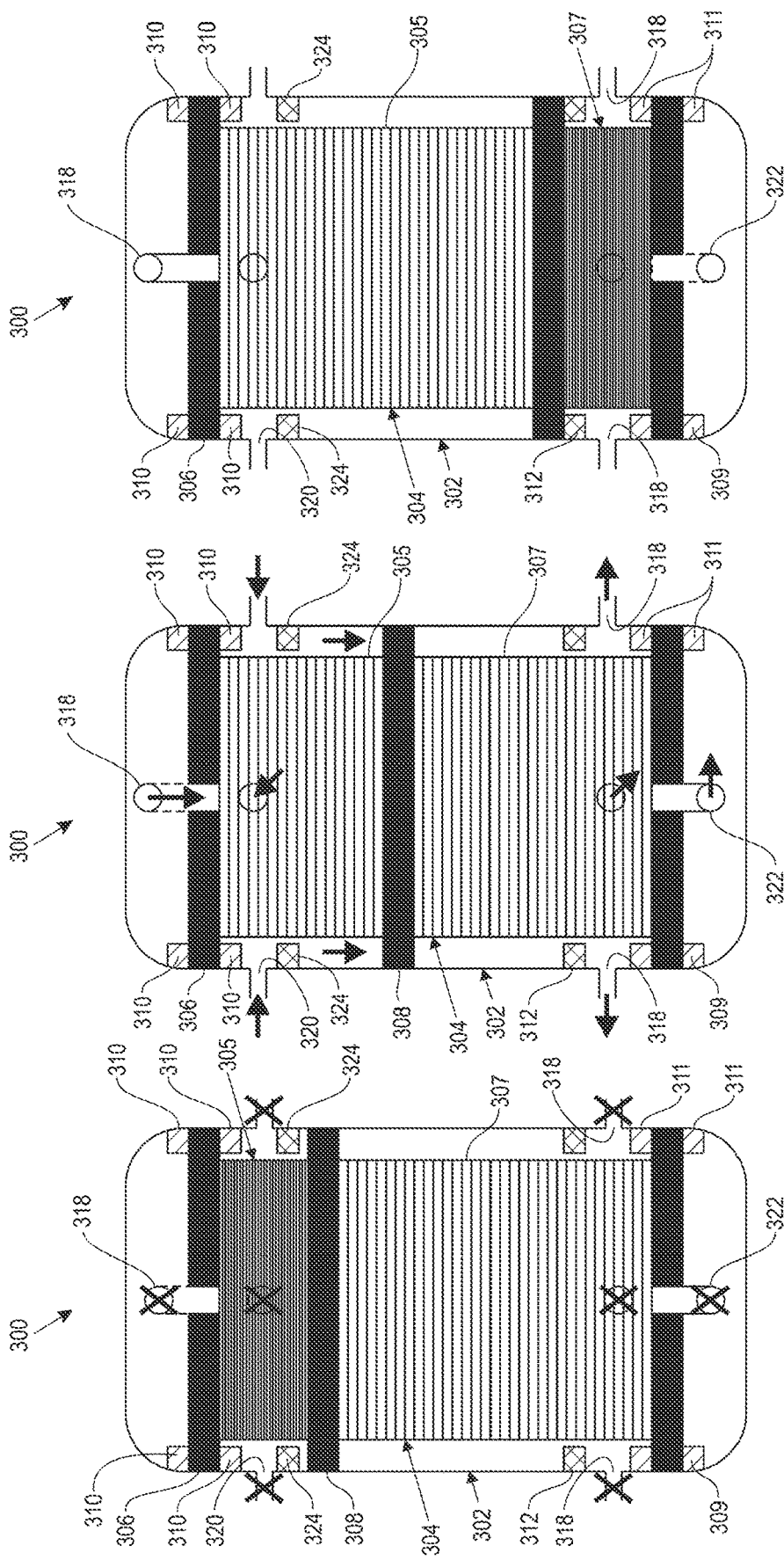
FIGS. 8A-8C are front sectional views of the apparatus of FIG. 7 through three (3) operations in a filling process, in accordance with an embodiment of the disclosure.

FIGS. 8A-8C show the DVV reservoir apparatus 300 through three (3) operations in a filling process, in accordance with an embodiment of the disclosure. In FIG. 8A, the DVV reservoir apparatus 300 is oriented such that the opening 315, that can be connected to the sterile I/O device 116 (not shown), is facing upwards. The first portion 305 of the variable volume reservoir 304 is shown in a fully, or generally, compressed state. The second portion 307 of the variable volume reservoir 304 can be expanded and can include air. The lower and upper pairs of air valves 318, 320, on both sides of the apparatus 300 near both ends, are shown closed, as indicated by the X's in the figure. Also, the opening 315 to the sterile I/O device 116 is closed and the air valve 322 is shown closed.

In FIG. 8B, a further operation is shown in which the first portion 305 of the variable volume reservoir 304 has begun to be filled with a sterilization agent (e.g., fluid). The V1 valve 212 and the V3 valve 214 (shown in FIG. 2A) can be opened prior to the operation shown in FIG. 8B. As shown in FIG. 8B, the pairs of air valves 318, 320 are all opened. Air is taken in by air valves 320 and moves out through air valves 318, as shown by the arrows. External pumps can be utilized for filling with the sterilization agent, such as diluted nitrogen dioxide, for example. The sterilization agents (fluids) described throughout the disclosure can be any suitable sterilization agent, with one example being diluted nitrogen dioxide.

FIG. 8C shows another operation and illustrates the DVV reservoir apparatus 300 once the filling process is stopped or completed. The moveable piston head 308 has reached the stop 312 and the filling process is shown completed in the figure. The DVV reservoir apparatus 300 can then be held in a steady state until a time period has passed and sterilization of the DVV reservoir apparatus 300 is complete. Alternatively, the DVV reservoir apparatus 300 can, for example, be transported to a customer site to be used in a system at the site. As yet another example alternative, the DVV reservoir apparatus 300 can be sold with and accompany a system that can use the DVV reservoir apparatus 300 prior to operation of the system.

Figure 9:
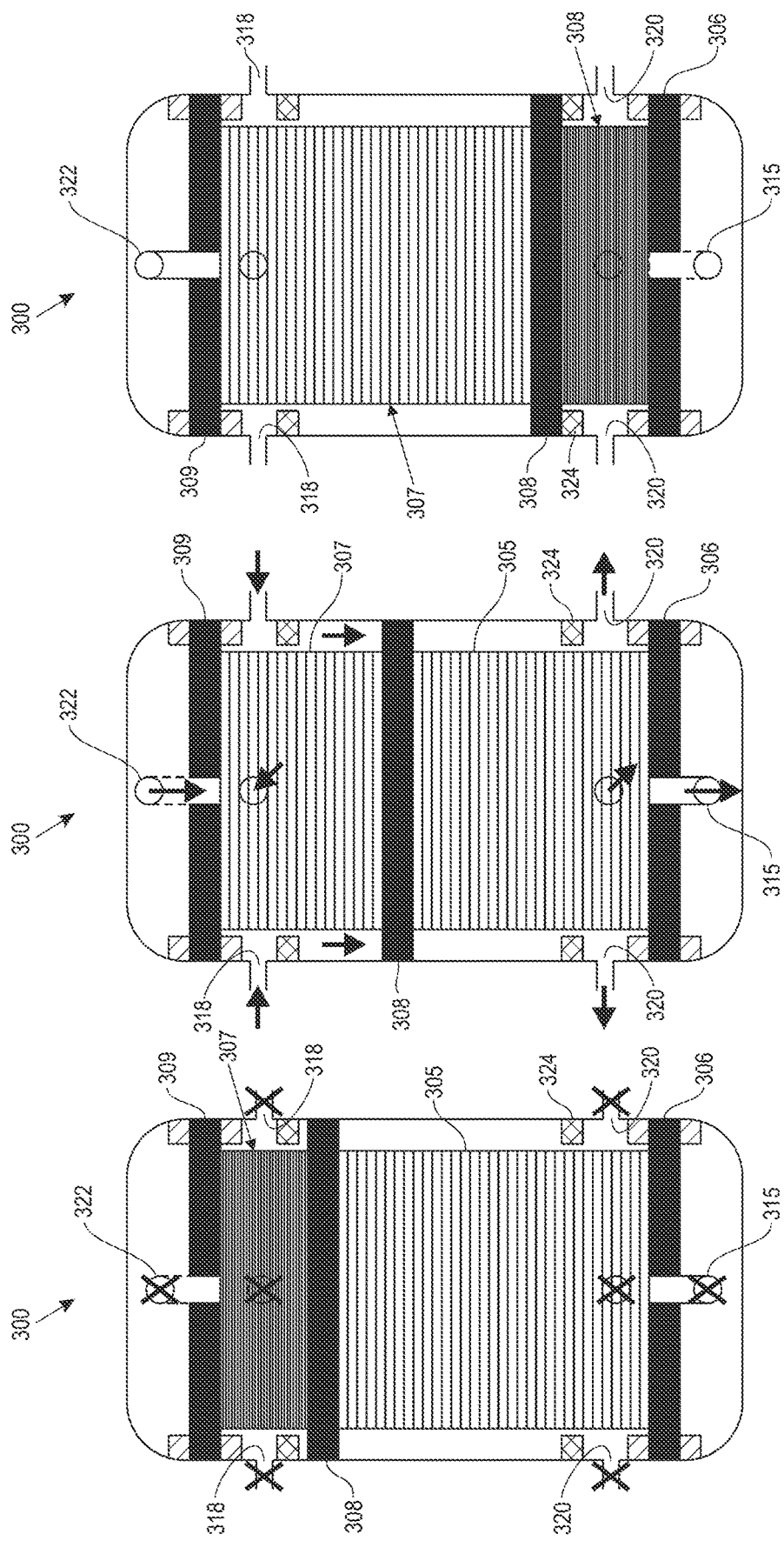
FIGS. 9A-9C are front sectional views of the apparatus of FIG. 7 through three (3) operations in a draining and filling process, in accordance with an embodiment of the disclosure.

FIGS. 9A-9C show the DVV reservoir apparatus 300 through three (3) operations in a contemporaneous draining and filling process, in accordance with an embodiment of the disclosure. The DVV reservoir apparatus 300 and correlating process can include the uptake of a used fluid from a system at the same time as draining a sterilization agent into the system. FIG. 9A shows a subsequent operation after that shown in FIG. 8C, for example, in which the DVV reservoir apparatus 300 is inverted and oriented such that the opening 315 to the sterile I/O device 116 (not shown) is facing downwards. The air valves 318, 320, 322 are closed as indicated by the X's. An external pump (not shown) can be used for the draining process.

FIG. 9B shows the moveable piston head 308 (by arrows) moving downward in order to empty or drain (e.g., collapse) the first portion 305 of the variable volume reservoir 304.

The air valves 318, 320, 322 are opened. Air can enter the air valves 318, 322 and move out of the air valves 320, as shown by the arrows. Sterilization agent is shown moving out or draining out of the opening 315 by the arrow. At the same time, movement of the moveable piston head 308 also causes the second portion 307 of the variable volume reservoir 304 to expand. Accordingly, a used (no longer sterile, possibly) fluid or air in the surroundings can be taken in and held by the second portion 307 of the variable volume reservoir 304.

The moveable piston head 308, in FIG. 9C, is shown in contact with the stop 324. The sterilization agent in the first portion 305 of the variable volume reservoir 304 is all or nearly drained. The second portion 307 of the variable volume reservoir 304 can be filled with used fluid taken up from the system into which the DVV volume reservoir apparatus 300 is inserted. Alternatively, the second portion 307 can be filled with air.

An example use for the DVV reservoir apparatus 300 can be using the DVV reservoir apparatus 300 such as that shown in FIG. 9A in a system, such as a computer server. The DVV reservoir apparatus 300 can include a sterile gas (inert or disinfecting) in the first portion 305 of the variable volume reservoir 304. After the DVV reservoir apparatus 300 with the sterile gas included is inserted into the server, the sterile gas can be drained into the system while any cooling liquid, for example, which was present in the system, can be taken up by second portion 307 of the variable volume reservoir 304. The DVV reservoir apparatus 300 can then be removed from the server.

Another example use for the DVV reservoir apparatus 300 can be using the DVV reservoir apparatus 300 such as that shown in FIG. 9A in a system, such as a computer server. The DVV reservoir apparatus 300 can include a sterile cooling liquid in the first portion 305 of the variable volume reservoir 304. After the DVV reservoir apparatus 300 with the sterile cooling liquid included is inserted into the server, the sterile cooling liquid can be drained into the system while sterile gas, for example, which was present in the system, can be taken up by second portion 307 of the variable volume reservoir 304. The DVV reservoir apparatus 300 can then be removed from the server.

Figure 10:
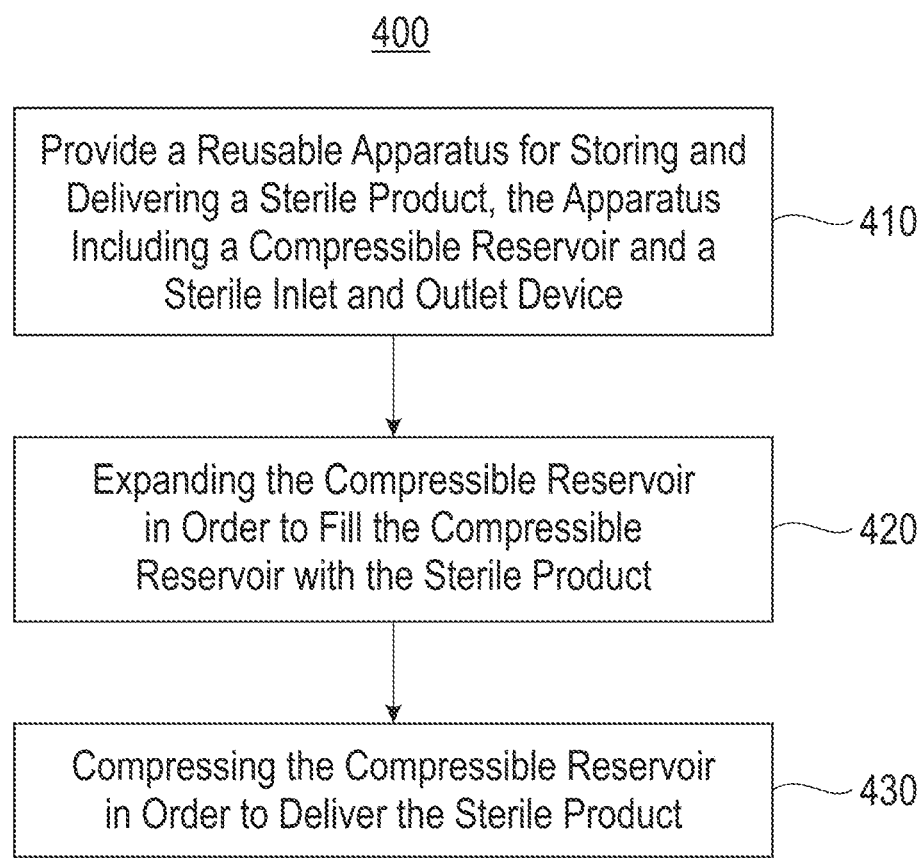
FIG. 10 is a flow diagram of a method of storing and delivering a sterile product, in accordance with an embodiment of the disclosure.

FIG. 10 shows a flow diagram of a method of storing and delivering a sterile product, in accordance with an embodiment of the disclosure. The method can include an operation 410 of providing a reusable apparatus for storing and delivering a sterile product. The reusable apparatus can include: a compressible reservoir adapted to be compressed and expanded to allow for filling, storing and delivering the sterile product; and a sterile I/O device including an inlet portion and an outlet portion. The sterile I/O device is connected to the compressible reservoir and adapted to allow the sterile product to be filled from exterior to the reusable apparatus and into the compressible reservoir through the inlet portion and adapted to allow the sterile product to be delivered from the compressible reservoir through the outlet portion. The method can include another operation 420 of expanding the compressible reservoir to fill the compressible reservoir with the sterile product through the inlet portion of the sterile I/O device. The method can further include an operation 430 of compressing the compressible reservoir to deliver the sterile product from outlet portion of the sterile I/O device of the reusable apparatus. The method can also include an operation of expanding the second compressible reservoir to allow for the second product to fill the second compressible reservoir.

For purposes of description herein, the terms "upper," "lower," "top," "bottom," "left," "right," "rear," "front," "vertical," "horizontal," and derivatives thereof shall relate to the device s as oriented in the figures. However, it is to be understood that the devices can assume various alternative orientations and step sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A reusable apparatus for storing and delivering a sterile product, the reusable apparatus comprising:
    a compressible reservoir adapted to allow for filling, storing, and delivering the sterile product;
    a sterile inlet and outlet device including an inlet portion and an outlet portion; and at least one valve included in each of the inlet and the outlet portions of the sterile inlet and outlet device,
wherein the at least one valve is adapted to be opened or closed to control filling or draining of the sterile product into or from the reusable apparatus, and the sterile inlet and outlet device is connected to the compressible reservoir and is adapted to allow the sterile product to be filled from an exterior of the reusable apparatus and into the compressible reservoir through the inlet portion and adapted to allow the sterile product to be delivered from the compressible reservoir through the outlet portion.

2. The reusable apparatus of claim 1,
an outer shell adapted to house the compressible reservoir,
wherein the sterile inlet and outlet device extends through the outer shell and between the compressible reservoir and the exterior of the reusable apparatus.

3. The reusable apparatus of claim 2, further comprising:
an airtight, fixed piston head located within the outer shell and attached to one end of the compressible reservoir,
wherein the sterile inlet and outlet device extends through the piston head to access the compressible reservoir.

4. The reusable apparatus of claim 2, further comprising:
an airtight, moveable piston attached to one end of the compressible reservoir and adapted to move within the outer shell and move with expansion and compression of the compressible reservoir,
wherein the moveable piston forms an airtight seal with an inner surface of the outer shell.

5. The reusable apparatus of claim 4, further comprising:
a stop located on the inner surface of the outer shell and adapted to limit expansion of the compressible reservoir within the outer shell.

6. The reusable apparatus of claim 2, further comprising:
a plurality of air valves adapted to allow air from the exterior of the reusable apparatus to enter and exit the outer shell.

7. A reusable apparatus for filling, storing, and delivering a first sterile product and for filling and storing a second sterile product, the reusable apparatus comprising:
a first compressible reservoir adapted to allow for filling, storing and delivering the first sterile product;
a second compressible reservoir adapted to allow for filling, storing and delivering the second sterile product; and
a sterile inlet and outlet device including an inlet portion and an outlet portion,
wherein the sterile inlet and outlet device is connected to the first compressible reservoir and is adapted to allow the first sterile product to be filled from an exterior of the reusable apparatus and into the first compressible reservoir through the inlet portion and adapted to allow the first sterile product to be delivered from the first compressible reservoir through the outlet portion.

8. The reusable apparatus of claim 7, further comprising:
an outer shell adapted to house the first and second compressible reservoirs,
wherein the sterile inlet and outlet device extends through the outer shell and between the first compressible reservoir and the exterior of the reusable apparatus.

9. The reusable apparatus of claim 8, further comprising:
an opening extending through the outer shell and between the second compressible reservoir and the exterior of the reusable apparatus,
wherein the opening includes a valve adapted to allow for the second sterile product to enter or exit the second compressible reservoir.

10. The reusable apparatus of claim 8, further comprising:
an airtight, fixed piston head located within the outer shell and attached to one end of the first compressible reservoir,
wherein the sterile inlet and outlet device extends through the piston head to access the first compressible reservoir.

11. The reusable apparatus of claim 8, further comprising:
an airtight, moveable piston attached to ends of both the first and second compressible reservoirs and adapted to move within the outer shell and move with expansion and compression of the first and second compressible reservoirs,
wherein the moveable piston forms an airtight seal with an inner surface of the outer shell.

12. The reusable apparatus of claim 11, further comprising:
a first stop and a second stop located on the inner surface of the outer shell and adapted to limit expansion of the first and second compressible reservoirs, respectively, within the outer shell.

13. The reusable apparatus of claim 7, further comprising:
at least one valve included in each of the inlet and the outlet portions of the sterile inlet and outlet device,
wherein the at least one valve is adapted to be opened or closed in order to control filling or draining of the first sterile product into or from the first compressible reservoir apparatus.

14. A method of storing and delivering a sterile product, the method comprising:
providing a reusable apparatus for storing and delivering the sterile product, comprising:
a compressible reservoir adapted to be compressed and expanded to allow for filling, storing, and delivering the sterile product; and
a sterile inlet and outlet device including an inlet portion and an outlet portion,
wherein the sterile inlet and outlet device is connected to the compressible reservoir and is adapted to allow the sterile product to be filled from an exterior of the reusable apparatus and into the compressible reservoir through the inlet portion and adapted to allow the sterile product to be delivered from the compressible reservoir through the outlet portion;
expanding the compressible reservoir to fill the compressible reservoir with the sterile product through the inlet portion of the sterile inlet and outlet device; and
compressing the compressible reservoir to deliver the sterile product from the outlet portion of the sterile inlet and outlet device of the reusable apparatus.

15. The method of claim 14, wherein the reusable apparatus further comprises:
an airtight, moveable piston attached to one end of the compressible reservoir and is adapted to move within the outer shell and move with expansion and compression of the compressible reservoir,
wherein the moveable piston forms an airtight seal with an inner surface of the outer shell.

16. The method of claim 15, wherein the expanding and the compressing cause the moveable piston to move within the outer shell of the reusable apparatus.

17. The method of claim 14, wherein the reusable apparatus further comprises:
a second compressible reservoir adapted to expand to allow for filling and storing a second sterile product.

18. The method of claim 17, further comprising:
expanding the second compressible reservoir to allow for the second sterile product to fill the second compressible reservoir.

\* \* \* \* \*